United States Patent [19]
Tournassat et al.

[11] Patent Number: 6,119,281
[45] Date of Patent: Sep. 19, 2000

[54] DEVICES FOR METERING FLUIDS IN RESPONSE TO LEVEL CHANGES

[76] Inventors: Claude Tournassat, Chemin des Renoncules, F-38330 Saint-Ismier; Yves Lecoffre, 2, Place d'Apvril, F-38000 Grenoble, both of France

[21] Appl. No.: 09/155,330

[22] PCT Filed: Mar. 20, 1997

[86] PCT No.: PCT/FR97/00494

§ 371 Date: Feb. 5, 1999

§ 102(e) Date: Feb. 5, 1999

[87] PCT Pub. No.: WO97/36218

PCT Pub. Date: Oct. 2, 1997

[30] Foreign Application Priority Data

Mar. 27, 1996 [FR] France .................................. 96 04126

[51] Int. Cl.[7] .................................................. G05D 7/01
[52] U.S. Cl. ............................ 4/227.5; 4/227.6; 4/227.7; 137/268
[58] Field of Search .................. 4/227.5, 227.6, 4/227.7; 137/268

[56] References Cited

U.S. PATENT DOCUMENTS

| | | | |
|---|---|---|---|
| 1,144,525 | 6/1915 | Blake | 4/227.7 X |
| 1,175,032 | 3/1916 | Williams | 4/227.7 |
| 1,623,132 | 4/1927 | Pennell et al. | |
| 1,728,737 | 9/1929 | Stoner | |
| 3,806,965 | 4/1974 | Lerner | 4/227.5 |
| 4,186,856 | 2/1980 | Dirsking | 4/227.7 X |
| 4,209,864 | 7/1980 | Lindauer | 4/227.3 X |
| 4,375,109 | 3/1983 | Jones | 4/227.6 |
| 4,453,278 | 6/1984 | Doggett et al. | 4/227.7 |
| 4,459,710 | 7/1984 | Keyes et al. | 4/227.7 |
| 4,485,500 | 12/1984 | Melville | 4/227.7 |

FOREIGN PATENT DOCUMENTS

| | | |
|---|---|---|
| 0 570 326 | 11/1993 | European Pat. Off. |
| 624 731 | 1/1936 | Germany |
| WO 83/00713 | 3/1983 | WIPO |

*Primary Examiner*—Gerald A. Michalsky
*Attorney, Agent, or Firm*—Young & Thompson

[57] ABSTRACT

The invention concerns a device for delivering a calibrated volume of a first liquid in relation to the filling or the draining of a main container with a second liquid, characterized in that it comprises:

said main container containing said second liquid and provided with means for controlling filling and draining cycles of said second liquid, an auxiliary container containing said first liquid; and a calibration member having a generally vertical direction and having a lower end and a top end, said lower end of the calibration member being connected to said main container to allow said first or second liquid to enter said calibration member from a height related to the height of the second liquid in said main container when filling said main container and means for controlling the exit of a volume of said first liquid out of said auxiliary container substantially equal to the volume of the first or the second liquid that has entered said calibration member during a phase of draining said main container.

4 Claims, 2 Drawing Sheets

DEVICES FOR METERING FLUIDS IN RESPONSE TO LEVEL CHANGES

BACKGROUND OF THE INVENTION

The present invention relates to the area of dosing fluids from a reservoir.

DESCRIPTION OF THE RELATED ART

In many applications employing dosing operations quantities of fluids must very frequently be injected in accordance with a predefined function of the variation in the level of the liquid contained in a reservoir. The quantities injected must very often be proportional to the variation in the level or in the volume of liquid in the reservoir, said function then being linear relative to the volume or to the flowrate.

These operations generally necessitate the use of complex equipment, for example a system made up of a level sensor, a dosing pump and a regulator. This type of equipment is often costly, includes mechanical parts and sealing parts likely to deteriorate with time and can give rise to problems in use in aggressive or explosive environments or environments to which access is controlled.

On the other hand, if the above function can be assured without moving mechanical parts, without seals and without electronic systems, using materials suitable to the fluids to be conveyed, very high reliability can be achieved for low investment and operating costs. Dosing techniques can also be used in consumer equipment without increasing the cost of manufacture.

SUMMARY OF THE INVENTION

The present invention concerns a method of dosing a fluid initially contained in a reservoir R1, said dosing being assured by the use of variations in the level of a liquid contained in a reservoir R2, said variation in level enabling transfer of controlled quantities of fluids from one reservoir to the other and in the pipes connecting the two reservoirs.

The above aim is achieved, in accordance with the invention, by a device for delivering a calibrated volume of a first liquid in relation to the filling or the draining of a main container with a second liquid, characterized in that it comprises:

said main container containing said second liquid and provided with means for controlling filling and draining cycles of said second liquid, an auxiliary container containing said first liquid; and a calibration member having a generally vertical direction and having a lower end and a top end, said lower end of the calibration member being connected to said main container to allow said first or second liquid to enter said calibration member from a height related to the height of the second liquid in said main container when filling said main container and means for controlling the exit of a volume of said first liquid out of said auxiliary container substantially equal to the volume of the first or the second liquid that has entered said calibration member during a phase of draining said main container.

BRIEF DESCRIPTION OF THE DRAWINGS

Other features and advantages of the present invention will become more clearly apparent after reading the following description of the principles and various embodiments of the invention given by way of non-limiting example. The description refers to the accompanying drawings, in which.

DESCRIPTION OF THE PREFERRED EMBODIMENTS

Figure 1:
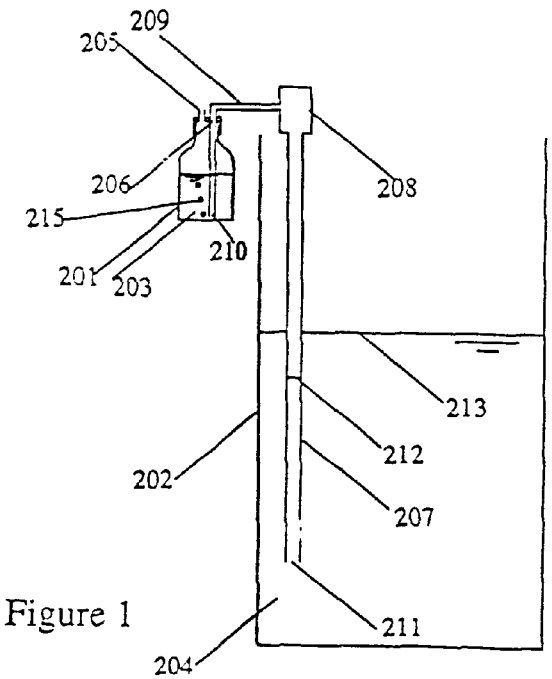
FIG. 1 illustrates one embodiment of the invention in which a controlled quantity of liquid is extracted from the reservoir R1 as a result of draining the reservoir R2.

FIG. 1 shows a system for extracting a volume v from a reservoir R1 when the reservoir R2 is being drained. It shows the reservoir R1 (201) containing the product to be dispensed 203 and the receiving reservoir R2 (202) containing the liquid 204. The reservoir R1 has two outlet orifices 205 and 206 at the top. The orifice 205 is in communication with the atmosphere above the free surface 213 of the reservoir R2. The orifice 206 is connected by the pipe 209 to the intermediate reservoir 208 which is in turn connected to the dip tube 207 entering the liquid 204 contained in the tank R2. When the reservoir R2 is empty, the tube 207 is itself empty of liquid. When liquid is poured into the reservoir R2 the level 213 rises and the level 212 in the tube also rises, compressing the air contained in the upper part of the tube 207. This forces a flow of air 210 to enter the liquid contained in the reservoir R1 (201). It escapes in the form of bubbles 215 into the liquid 203 and then spreads into the atmosphere via the vent tube 205. Thus the level in the tube 207 can rise without unduly disturbing the liquid contained in the reservoir R1. When the reservoir R2 is drained, the levels 213 and then 212 fall. A partial vacuum is created in the upper part of the pipe 207. This forces the liquid 203 contained in the reservoir R1 to enter the pipe 209 and then the reservoir 208 to reach the pipe 207 in the form of droplets or streams. Application of the laws of hydrostatics shows that the air pressure in the upper part of the tube 207 is practically constant and equal to atmospheric pressure if the height of the reservoir R1 is low. It can be deduced from this that the flowrate aspirated in the column 207 is equal to the product of the rate of descent of the free surface 213 by the cross-section s of the pipe 207. The same relations therefore apply as in the previous situation, namely a reduction in height $\Delta h$ modifies the volumes in accordance with the following laws:

volume of liquid entering reservoir R2 (202), $V = S \Delta h$ volume of liquid entering tube 207, $v = s \Delta h$ volume of liquid leaving reservoir R1 (201), also equal to $v = s \Delta h$ the ratio of the volumes transferred v and V is equal to the ratio of the cross-sections s and S, as in the situation illustrated by FIG. 1.

Draining terminates by venting of the end 211 of the pipe 207 to the atmosphere. The remaining liquid in said tube 207 then drops into the reservoir R2. The cycle can then begin again.

The vertical position of the reservoir R1 can be varied, subject to the limitation specific to this application that the end of the pipe 209 must always be above the level 213.

Note that in the initial phase of filling the system doses the air escaping from the pipe 205 in proportion to the variation in the level 213 and to the cross-section s.

Figure 2:
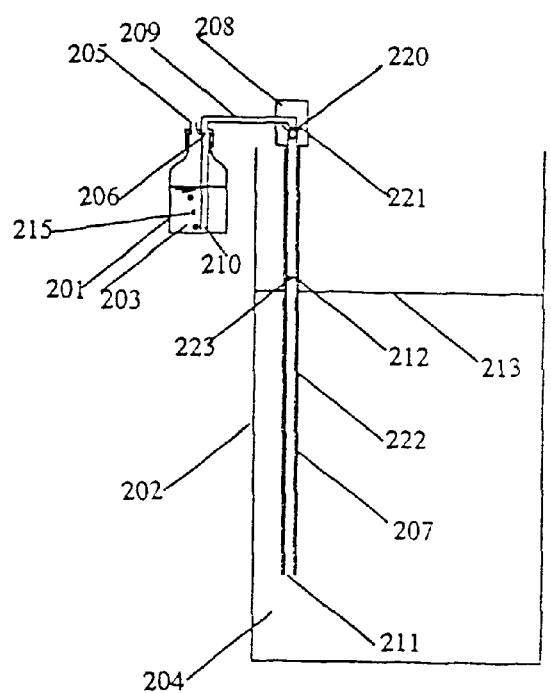
FIG. 2 illustrates another embodiment of the equipment in which the fluid extracted from the reservoir R1 is introduced practically without delay into the reservoir R2.

FIG. 2 shows a variant of the previous system characterized in that the droplets 220 coming from the pipe 209 drop into a receiving cone 221 and then into a pipe 222 having a smaller diameter than the pipe 207. This prevents the liquid from R1 stagnating above the fluid aspirated into 207 during filling of R2. Its reaching the reservoir R2 would then be delayed during draining. To the contrary, by using the tube 222, levels 212 and 223 in the tubes 207 and 222 being virtually identical when the densities of the fluids 203 and 204 are similar, the transit time of the fluid 203 from the end 224 of the tube 222 will be much shorter than in the previous situation. The ratio of the rates of descent between the present situation and the FIG. 2 situation is equal to s/s', s and s' being respectively the ratios of the cross-sections of the active part of the pipe 207 to that of the pipe 222. The fluid to be dosed can therefore reach R2 very quickly.

Figure 3:
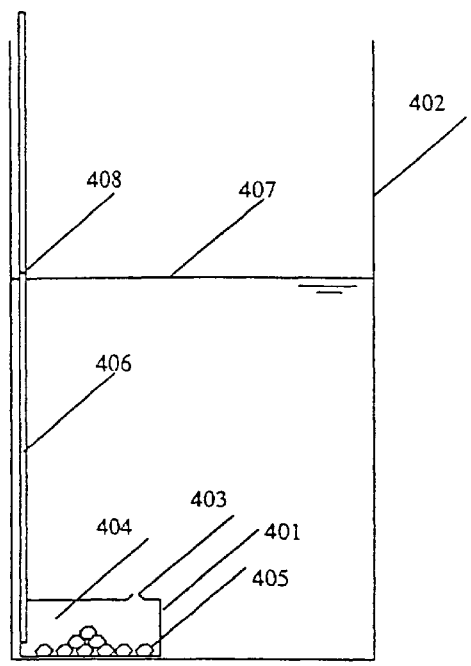
FIG. 3 shows an embodiment of the equipment in which the fluid from the reservoir R2 is introduced into the reservoir R1 due to an increase in the level in the reservoir R2 and mixes with the fluid initially contained in R1, a controlled flowrate of said mixture then being extracted from R1 when R2 is drained by draining a pipe open at its top.

FIG. 3 shows a dosing device designed to inject a dose of a liquid saturated with a dissolved product from a solid material each time a reservoir R2 (402) is drained. The liquid saturated with dissolved product 404 is contained in a reservoir R1 (401) which has a small orifice 403 at the top. R1 contains soluble solids 405 that keep the liquid 404 saturated regardless of temperature variations. The small reservoir R1 is also provided with a long pipe 406 the open end of which is above the top level of the reservoir. The pipe 406 has a cross-section s.

Before filling R2, it is assumed that R1 is filled with a saturated liquid the top level of which is that of the orifice 403. When R2 is filled, the level 407 in R2 and the level 408 in the tube 406 rise. These levels are equal if surface tension effects are ignored and similar otherwise. Clearly, as R2 fills, liquid from R2 enters R1. This liquid mixes with the liquid already present in R1 and becomes saturated with the dissolved material. When R2 is drained the level drops in R2 and in the tube 406. Liquid is therefore ejected from R1 and mixes with the liquid contained in R2. If the reservoir R2 (402) and the pipe 406 are cylindrical with respective cross-sections S and s, the ratio of the flowrates q escaping from R1 and Q escaping from R2 is again equal to S/s. The above system therefore constitutes a particularly simple means of introducing a flowrate of a liquid saturated with a dissolved material proportional to a main flowrate. The precision of the ratio of the volumes transferred during draining can be excellent. The above system therefore constitutes a cheap, accurate and particularly reliable dosing device.

Figure 4:
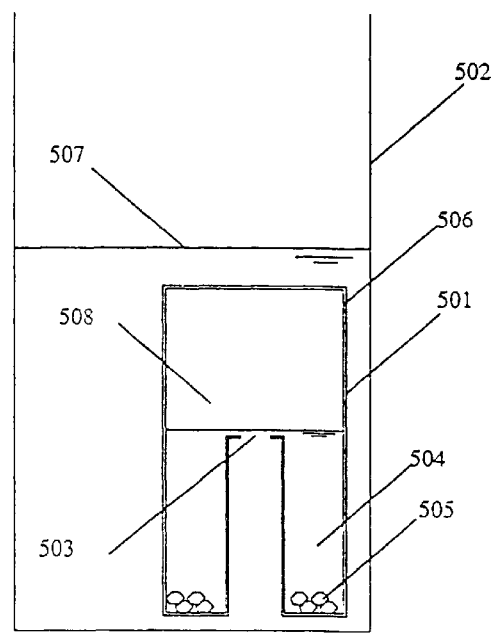
FIG. 4 illustrates another embodiment of the previous function in which the flowrate is controlled in a closed pipe forming a reservoir.

FIG. 4 shows a dosing device designed to inject a dose of a liquid saturated with a dissolved product from a solid material each time a reservoir R2 (502) is drained. The liquid 504 saturated with dissolved product is contained in a reservoir R1 (501) which has a small orifice 503 at the top. R1 contains soluble materials 505 which keep the liquid 504 saturated regardless of temperature variations. The small reservoir R1 is also provided with a reservoir 506 the top of which is closed. The reservoir 506 contains air provided that the orifice 503 is at the base of said reservoir 506.

Before filling R2, it is assumed that R1 is filled with a saturated liquid the top level of which is that of the orifice 503. When R2 is filled the level 507 in R2 and the level and the pressure in the reservoir 506 rise because of the compressibility of gases. Clearly, as R2 fills liquid from R2 enters R1. This liquid merges with the liquid already present in R1 and becomes saturated with the dissolved material. When R2 is drained the level drops in R2 and in the reservoir 506. Saturated liquid is therefore ejected from R1 and mixes with the liquid contained in R2. The above system thus also constitutes a particularly simple means of introducing a flowrate of a liquid saturated with dissolved material proportional to a main flowrate. The precision of the ratio of the volumes transferred during draining can be excellent. Like the system shown in FIG. 4, the above system therefore constitutes a cheap, accurate and particularly reliable dosing device.

Figure 5:
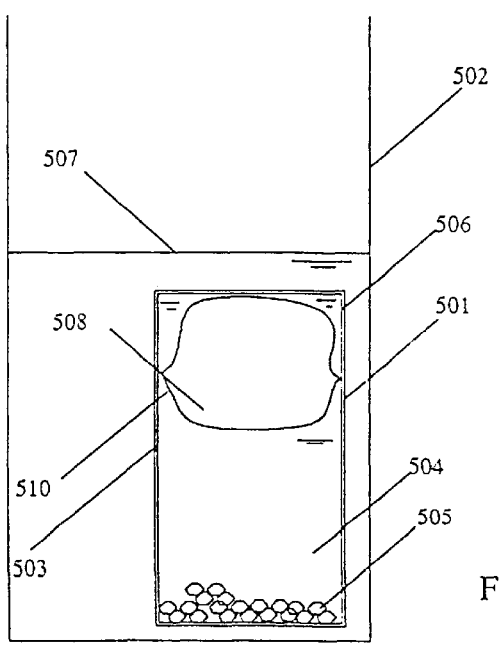
FIG. 5 represents a variation of the FIG. 4 solution.

FIG. 5 represents a variant of the solution represented in FIG. 4 in which the air contained in R2 is in a flexible envelope 510, preventing it from dissolving in the liquid contained in said reservoir. In this final solution it is immaterial whether the orifice 503 through which R2 communicates with the fluid contained in the reservoir R1 502 is at the top, bottom or side of the reservoir, as in FIG. 6. The position of the reservoir can be changed in azimuth without losing its efficiency.

What is claimed is:

1. A device for delivering a calibrated volume of a first liquid (404, 504) in relation to the filling or the draining of a main container (402, 502) with a second liquid, comprising:

said main container (402, 502) containing said second liquid and provided with means for controlling filling and draining cycles of said second liquid, an auxiliary container (401, 501) containing said first liquid (404, 504) wherein said main container and said auxiliary container communicate through a communication orifice (403, 503); and a calibration member (406, 506) having a generally vertical direction and having a lower end and a top end, said lower end of the calibration member being connected to said main container (402, 502) to allow said first or second liquid to enter said calibration member from a height related to the height of the second liquid in said main container when filling said main container, by flowing of the second liquid towards the main container through said communication orifice, and means for controlling the exit of a volume of said first liquid out of said auxiliary container substantially equal to the volume of the first or the second liquid that has entered said calibration member during a phase of draining said main container, by flowing of the second liquid towards the main container through said communication orifice, wherein said auxiliary container (401, 501) is connected at the top to said main container by a small orifice (403, 503), said auxiliary container contains a product (405, 505) which, combined with the second liquid passing through said container, gives said first liquid to be delivered (404, 504) and the bottom end of said calibration member (406) opens into said auxiliary container whereby said calibration member can receive said first liquid (404) from said auxiliary container.

2. A device according to claim 1, wherein the top end of the calibration member (406, 506) is closed whereby when the second liquid rises in the main container it enters said auxiliary container (401, 501), becoming converted into the first liquid, and enters said calibration member (406, 506), compressing the air that it contains, to a height related to the surface level (407, 507) of the second liquid in said main container.

3. A device according to claim 2, wherein the air (508) contained in said calibration member is enclosed in a deformable sealed envelope (510).

4. A device according to claim 1, wherein said calibration member (406) is a tubular member, said upper second end of which is open and is disposed at a higher level than the surface level (407) of the second liquid in said main container when said container is filled.

* * * * *